May 31, 1949. H. S. DIMMICK ET AL 2,471,417
DEVICE FOR LOCATING FAULTS IN CABLES
Filed Dec. 22, 1943 5 Sheets-Sheet 1

INVENTORS
HOWARD S. DIMMICK
FELTON S. JENKINS
BY William D. Hall
ATTORNEY

Inventors
Howard S. Dimmick
Felton S. Jenkins

By Harry M. Saragovitz
ATTORNEY

Patented May 31, 1949

2,471,417

UNITED STATES PATENT OFFICE 2,471,417

DEVICE FOR LOCATING FAULTS IN CABLES

Howard S. Dimmick and Felton S. Jenkins,
Philadelphia, Pa.

Application December 22, 1943, Serial No. 515,306

4 Claims. (Cl. 175—183)

(Granted under the act of March 3, 1883, as
amended April 30, 1928; 370 O. G. 757)

The invention described herein may be manufactured and used by or for the Government for governmental purposes, without the payment to us of any royalty thereon.

This invention relates to improvements in methods and devices for locating faults in cables.

Heretofore, the location of a fault or failure in a cable depended upon the use of either the Varley loop or the Wheatstone bridge method, by means of which the approximate location of the fault or failure is determined by calculation of the capacitance or resistance from some initial point. These methods are objectionable in that they require too much time and mathematical calculations.

It is, therefore, an object of this invention to provide a method and a device for rapidly locating faults in cables without requiring mathematical calculations.

A further object is the provision of an electronic device for detecting and locating faults in cables by producing a visual or audible signal. The exact location of the fault can be determined without requiring the removal of plugs, connectors, insulation or shielding. Heretofore, there has been no satisfactory method of determining the exact location of a short in a cable without opening the insulation in numerous places.

A further object is the provision of a device for locating faults in cables exactly and rapidly by visual means.

A further object is the provision of a device for locating faults in cables, which device can be efficiently used by persons having no previous electrical training.

These and other object are attained by the novel methods as well as the construction and arrangement hereinafter described and illustrated in the accompanying drawings, in which.

Figure 1:
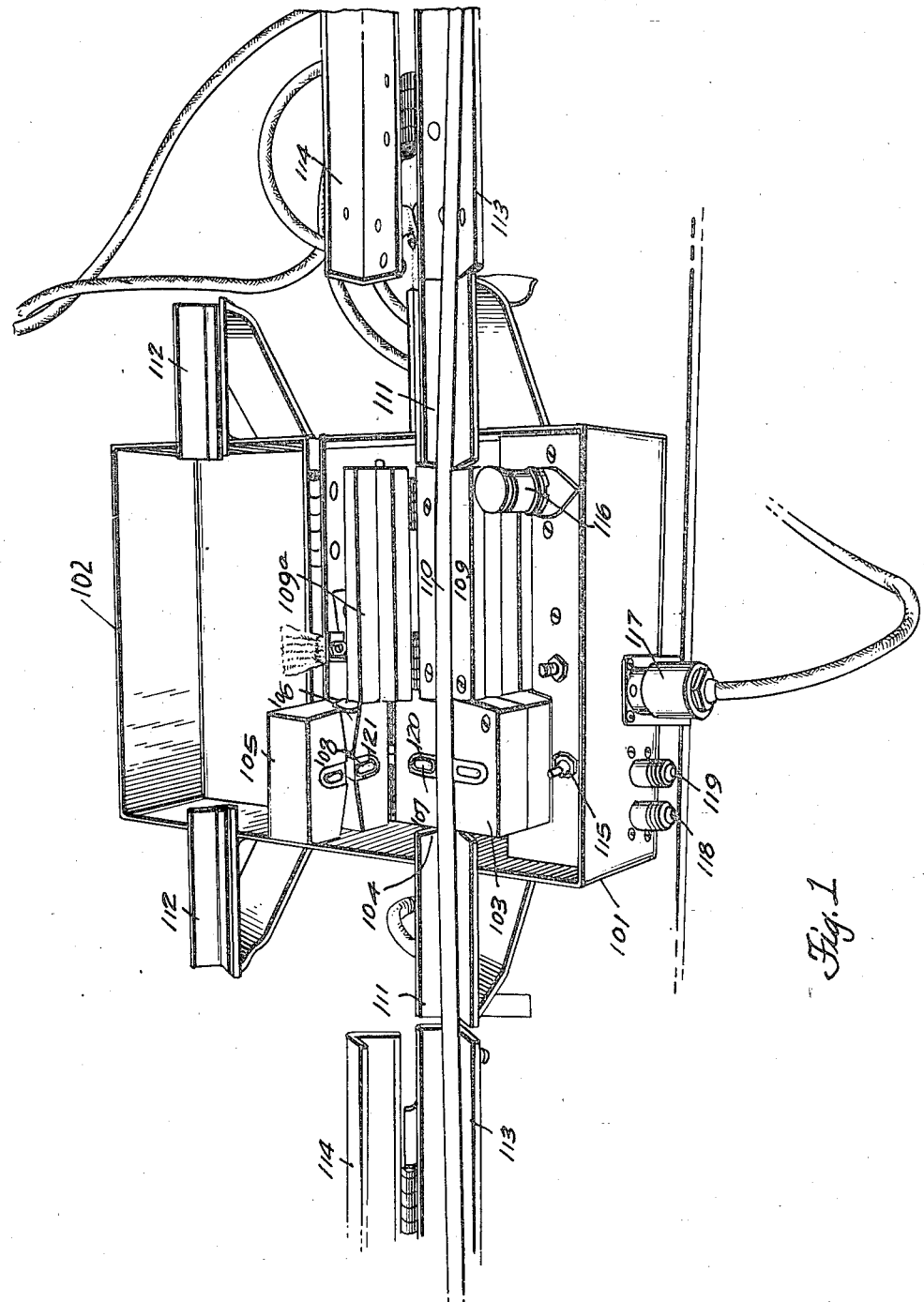
Fig. 1 is a perspective view of a detecting unit used in the device.
Figure 4:
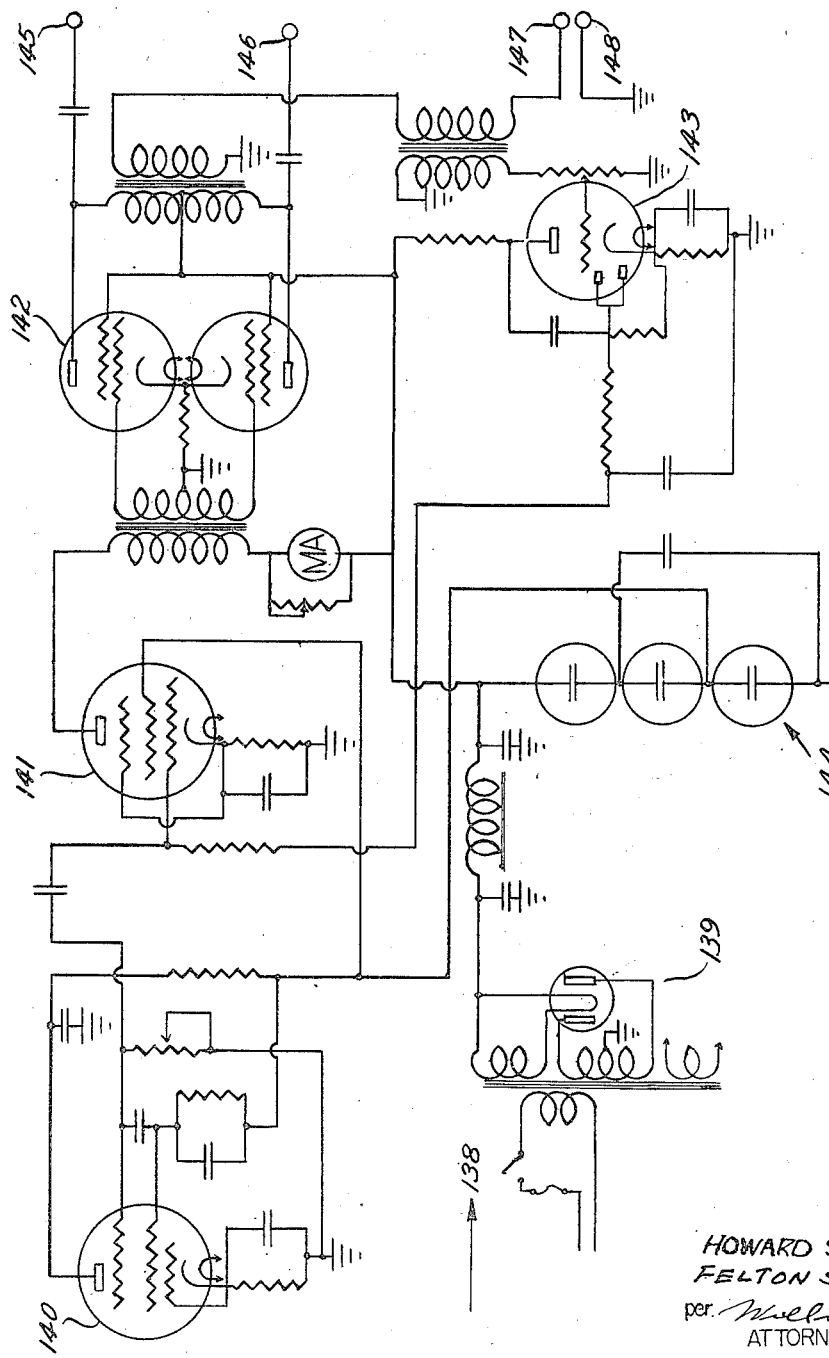
Fig. 4 is a schematic diagram of a power supply unit.

Referring to the drawings, in Fig. 1 is shown a detecting unit employed in the fault locating device. The detecting unit comprises a casing 101, having a cover 102 hinged thereto. Positioned in the casing 101 is a block 103 having a longitudinal groove 104 through which the cable 110 passes. Hinged to block 103 is a similar block 105 having a longitudinal groove 106 for the cable. Embedded in the blocks 103 and 105 and encircling the grooves 104 and 106 are semi-circular non-magnetic metal bands 107 and 108 which have wound about them respectively pick-up coils 120 and 121, as shown in Fig. 4, forming sections of a toroid perpendicular to the axis of the grooves. These coils are relatively short and are placed on the supporting ring so that their magnetic axes are preferably displaced substantially 90°.

The magnetic pick-up in coils 120 and 121 depends on the dissymmetry of the magnetic field produced by currents in the cable conductors. It will therefore be obvious that if the semi-circular pieces 107 and 108 on which coils 120 and 121 are mounted are magnetic, the dissymmetry is destroyed and no pick-up voltages will be obtained. This follows from the fact that in testing for short circuits the cable currents are always equal and opposite and the resultant magnetomotive force acting around a closed magnetic ring must be zero and hence no voltages will be induced in coils wound on such a ring. However, if the pieces 107 and 108 were short as compared with the circumference of the cable instead of being semi-circular, it would be possible to make these pieces of magnetic material.

The object of using two pick-up coils with axes substantially at right angles is to avoid possible failure of the pick-up when only one coil is used. A single coil will fail to pick up induced E. M. F. from currents within the cable when the plane of the conductors chance to be noninductively related to the pick-up coil. This right-angle relationship of the two coils is merely the preferable one. If desired, the axes of the two coils may be at any other angle except 180° to each other. If they were placed in a 180° relationship, it would be possible for both coils to be non-inductively related to the current-carrying cable conductors.

Also positioned in the casing 101 is an electrode 109 not part of the present invention for detecting open circuits having a groove in alinement with the groove 104. The electrode 109 has hinged thereto a grooved cover 109a. Supported by and projecting from the casing 101 are guide troughs 111 which are arranged to be covered by similar guide troughs 112 supported by the cover 102. Additional guide troughs 113 and covers 114 are provided so that the cable 110 will be suitably supported for a considerable length.

Also mounted in the casing 101 is a change over switch element 115, an amplifier tube 116, and amplifier cable connectors 117, 118, 119, the purpose of which will hereinafter be described.

Figure 2:
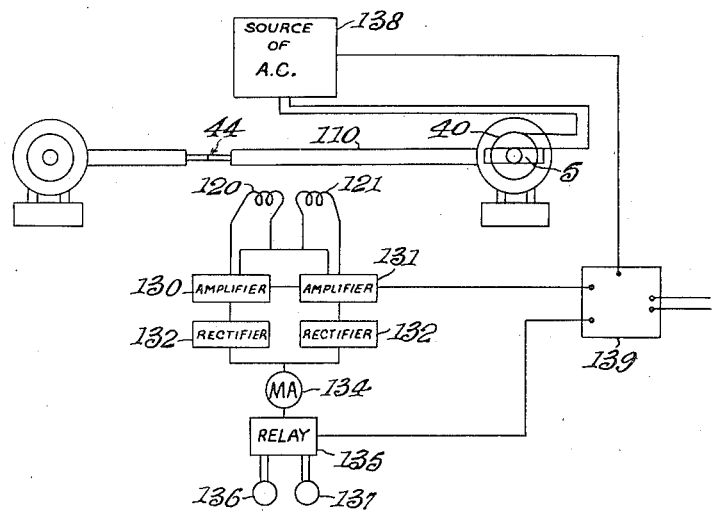
Fig. 2 is a diagram showing the arrangement of units for locating short circuits.
Figure 3:
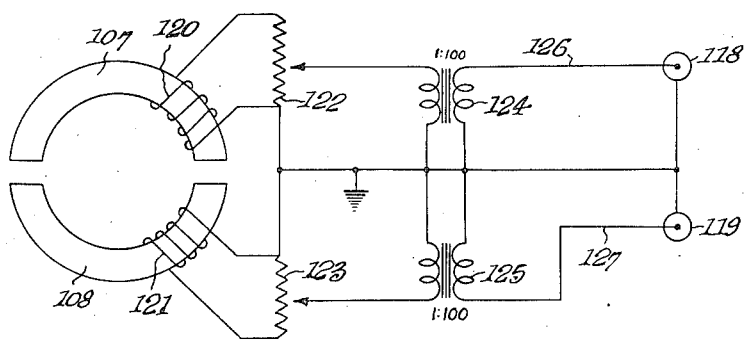
Fig. 3 is a schematic wiring diagram of the detector unit.

In Fig. 3 is shown a schematic wiring diagram of the detector unit. The coils 120 and 121 are positioned at 90° to each other and respectively wound about the semi-circular non-magnetic metal bands 107 and 108. The unit is connected to a dual channel amplifier unit 130, 131 shown in Fig. 5 by the coaxial cable connectors 119, 118. To balance the output of the coils 120 and 121, rheostats 122 and 123 are provided. Transformers 124, 125 are employed to match the input impedance of the dual channel amplifiers 130, 131 shown in Fig. 2.

Short circuits are detected by means of the coils 120 and 121, and open circuits by means of the electrode 109. The output of the transformers 124, 125 are fed through connectors 119, 118 to both of the dual channel amplifiers 130, 131.

To operate the device it is necessary to provide a source of alternating current (see Fig. 4) of a controlled value preferably of about 5000 cycles. Any audio-frequency, however, may be used. The source 138 (see Fig. 4) includes a power supply unit 139, an oscillator 140, a variable amplifier 141, and a power amplifier stage 142. Means 143 are provided to maintain the current output relatively constant while locating short circuits.

The rectified current from the power supply unit 139 is controlled by the voltage regulator tubes 144, one portion going to the oscillator 140 to produce the desired 5000 cycle frequency. Another portion provides plate excitation for amplifiers 141 and 142 which amplify the oscillator output, which then passes through constant current regulator 143 to leads 147 and 148.

While an alternating current source is preferably used for supplying current to the cable, as is well known in the art it is necessary only that this source be one of variable current. For example, interrupted direct current could be used.

In the dual channel amplifier unit (see Fig. 5), each channel has three amplifier stages and a rectifier unit 132. A power supply unit 137 and a relay 135 are common to both channels.

In operation, to locate a short circuit, an alternating current of any audio-frequency, such as 5000 cycles, is fed through the defective conductor 110, by means of rotating slip rings 40 and brush holder 5 (see Fig. 2). The current upon reaching the point of short returns through the conductor or shield by which the defective conductor is short circuited. The cable is moved from left to right through the axis of the toroid outlined by the coils 120 and 121. While the defect is at the left of the coils, an alternating current is induced in the coils and is amplified by the amplifiers 130, 131. The outputs of the amplifiers are rectified by rectifiers 132 and passed through an indicating instrument 134 and a relay 135, which causes a green light 136 to be lighted (see Fig. 2). When the deflect in the cable has moved to the right of coils 120, 121, there is no longer an alternating current induced in the coils. Consequently, the output of the amplifiers falls to zero, thereby releasing the armature of relay 135. This opens the circuit to green light 136 and closes a circuit through red light 137. Power for these units is supplied by a power unit 139.

As stated above, for the short circuit test, the output of the coils is passed through the two amplifiers 130, 131, each of which includes amplifier tubes 151, 132, 152. From tube 152 the amplifier current is returned to tube 132 which then acts as a rectifier. The rectified current then passes through an indicating meter 134 and relay 135 to control the lights as above described.

The voltages induced in coils 120, 121 which are positioned at 90° to each other, are amplified by two separate amplifiers 130 and 131. The existing output of the amplifiers indicates that current is flowing in the part of the cable that is in the center of the toroid formed by the coils 120, 121. When the cable is moved to such a position that this output decreases or ceases, there is an indication that the point of the cable which is shorted has passed the plane of the toroid. If the current decreases and does not cease entirely, this would indicate that there are more than one short circuit in the cable. Entire cessation of the current indicates that there is only one short. The cables are generally formed by two twisted wires. At certain axial angles to the cables the magnetic flux may be cancelled, and for this reason the two coils are positioned at 90° to each other. Two separate amplifiers are used so that the sum of the voltages can be registered regardless of the axial position of the defective section of the conductor.

When there is more than one short circuit or ground in a conductor, a decided decrease in alternating current induction pickup is noted when the first ground or short reaches the coil. Sufficient, however, is present in the cable to supply current to the next short circuit or ground. Induction pickup by the coil will occur until the last short circuit or ground is reached. The output of the amplifiers energizes a relay, which in turn lights a green lamp.

The action of the magnetic pick-up coils for locating short circuits will now be described in greater detail.

Figure 6:
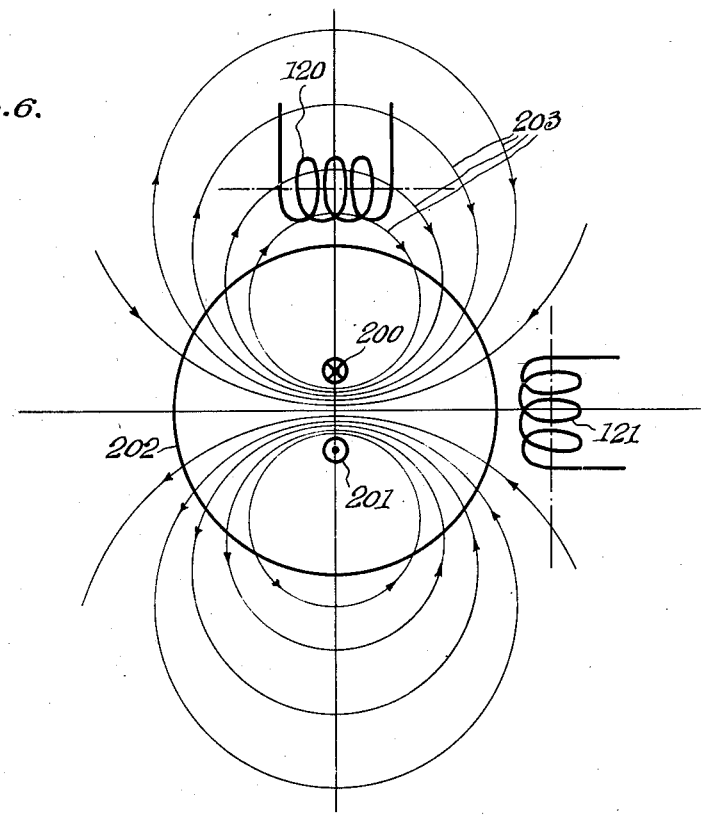
Fig. 6 is a diagram showing the magnetic fields and pick up coils for a short circuit in unarmored cable.

Referring to Fig. 6, two representative conductors of an unarmored multi-conductor cable are indicated in cross section at 200 and 201, the outer limits of the body insulation being indicated at 202. If the conductors are short circuited by a fault and energized with alternating current, magnetic fields are produced as indicated by the lines of force 203 for the instant the current directions are as shown.

Figure 5:
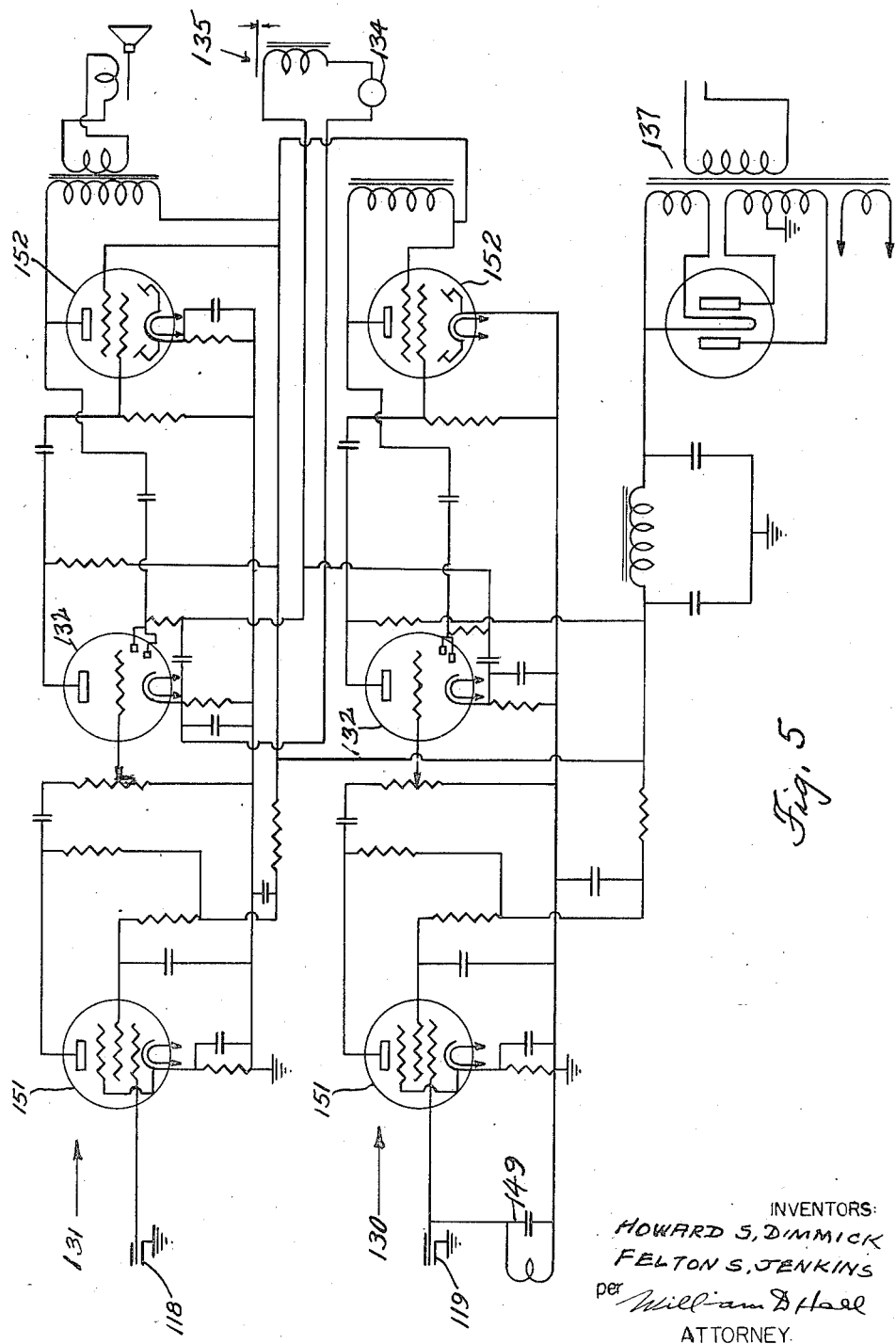
Fig. 5 is a schematic diagram of an amplifying unit.

If one of the pick-up coils, say 120, happens to lie as shown in the figure, the magnetic flux 203 threads through the turns of the coil and a voltage is induced which when amplified and rectified gives an indication on meter 134, Fig. 2 and Fig. 5. If now by chance the pick-up coil is on the magnetic axis as indicated at 121, it is evident that no flux cuts through the coil in a manner to generate an induced voltage. If only one coil is used, there are numerous places along the cable, due to the twisting of the strands, where no pick-up is obtained, any one of which might be interpreted as the location of the short.

To obviate this difficulty, it has been found satisfactory to provide two coils located at right angles as shown. Thus when coil 121 fails to pick up an induced voltage, coil 120 is in its most effective position and vice versa. If coils 120 and 121 are joined in series and a single amplifier used, a position of the cable may be found where the resultant induced voltage is again zero and a false indication obtained. It is necessary therefore to provide separate amplifiers and rectifiers for each pick-up coil to avoid risk of false dead spots.

In the case of an armored cable the same kind of action takes place but the explanation is not so evident. If the sheath were perfectly conducting, according to accepted electrical theory, no fields of any kind, electric or magnetic, could get out of the cable. Experiment, however, shows that fields, both electric and magnetic, do get out through the sheath. The explanation of this fact lies in the lack of perfect conduction in the sheath.

Figure 7:
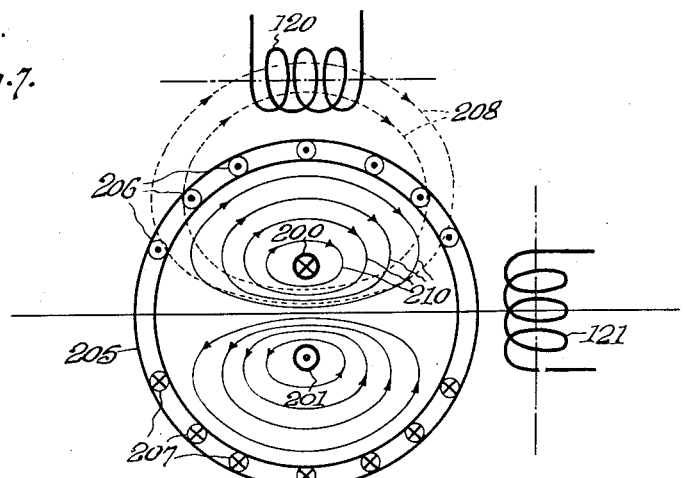
Fig. 7 is a diagram showing the magnetic fields and pick up coils for a short circuit in armored cable.

Referring now to Fig. 7, the cable is inclosed in a conducting sheath 205, the other designations being the same as in Fig. 6. The lines of magnetic force would, if they could, follow the same paths as indicated in Fig. 6. These fluxes would have to pass through the conducting sheath, and in so doing, generate voltages in the sheath. These induced voltages produce currents in the sheath which, if perfectly conducting, would exactly neutralize all magnetomotive force outside the sheath. In other words, the sheath currents neutralize all magnetic fluxes outside the sheath and confine it within the sheath. These sheath currents are in phase opposition to the exciting currents in the conductors, the distribution being somewhat as shown by the conventional notation 206 and 207. The magnetic fluxes stopped by the sheath currents are compelled to circulate within the sheath somewhat as shown at 210.

Since the sheath materials commonly used in practice are lead or steel armor, the conductivity is by no means perfect. The sheath currents therefore do not quite neutralize the exciting currents so that some magnetic flux does get through and although greatly reduced may be picked up by the same pick-up coils as those described. For example feeble magnetic flux 208 threads the turns of the pick-up coil 120, Fig. 7, similar to flux 203 of Fig. 6. A neutral position 121, Fig. 7, may also be found the same as in Fig. 6. These feeble pick-up voltages require considerable amplification which is provided for by the three-stage amplifier shown in Fig. 5.

Having described our invention, what we claim is:

1. A system for locating faults in a cable comprising, a source of potential varying with time, means for applying said potential between the separate conductors of the cable, fault locating means including two pick-up coils assembled on a non-magnetic ring-shaped core surrounding the cable and spaced along the periphery of the ring so that the angle between the magnetic axes is substantially a right angle, means for moving the cable relative to and in inductive relation to the pick-up coils, separate amplifying means connected to the output of each coil, rectifying means connected to the output of each amplifying means and indicating means responsive to the sum of the outputs of the rectifying means.

2. A system for locating faults in a cable comprising, a source of varying potential, means for applying said potential between the separate conductors of the cable, fault locating means having a cable recess to permit axial motion of the cable therethrough, said fault-locating means including two pick-up coils having magnetic axes in a plane substantially at right angles to the cable recess and to each other so that at all times when a current carrying portion of the cable is adjacent to the coils a potential will be electromagnetically induced in at least one of the coils, means for moving the cable relative to the fault-locating means, separate amplifying means connected to the output of each coil, rectifying means connected to the output of each amplifying means, and indicating means responsive to the sum of the outputs of the rectifying means.

3. A system for locating faults in a cable comprising, a source of varying potential means for applying said potential between the separate conductors of the cable, fault locating means having a cable recess through which the cable may be moved, said fault-locating means including two pick-up coils which are relatively short as compared with the circumference of the cable, the magnetic axes of the coils lying in a plane substantially at right angles to the cable recess and being at an angle other than 180° or exact coincidence to each other, means for moving the cable relative to the fault-locating means, separate amplifying means connected to the output of each coil, rectifying means connected to the output of each amplifying means, and indicating means responsive to the sum of the outputs of the rectifying means.

4. A system for locating faults in a cable comprising, a source of varying potential, means for applying said potential between the separate conductors of the cable, fault-locating means having a cable recess through which the cable may be moved axially, said fault-locating means including two pick-up coils which are relatively short as compared with the circumference of the cable, the magnetic axes of the coils lying in a plane substantially at right angles to the cable recess and being at right angles to each other, means for moving the cable relative to the fault-locating means, separate amplifying means connected to the output of each coil, rectifying means connected to the output of each amplifying means, and indicating means responsive to the sum of the outputs of the rectifying means.

HOWARD S. DIMMICK.
FELTON S. JENKINS.

REFERENCES CITED

The following references are of record in the file of this patent:

UNITED STATES PATENTS

| Number | Name | Date |
| --- | --- | --- |
| 925,594 | Pennell et al. | June 22, 1909 |
| 1,176,554 | Herzig | Mar. 21, 1916 |
| 1,247,660 | Garrison | Nov. 27, 1917 |
| 1,464,119 | Stoller et al. | Aug. 7, 1923 |
| 1,745,419 | Henneberger | Feb. 4, 1930 |
| 2,176,756 | Borden | Oct. 17, 1939 |
| 2,176,757 | Borden | Oct. 17, 1939 |
| 2,300,771 | Borden | Nov. 3, 1942 |
| 2,304,513 | Stearns | Dec. 8, 1942 |

FOREIGN PATENTS

| Number | Country | Date |
| --- | --- | --- |
| 691,408 | France | Oct. 21, 1930 |